Figure 1:
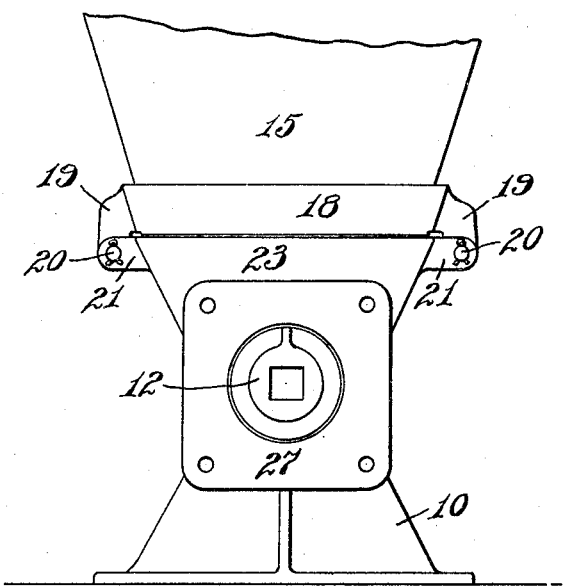

May 16, 1933. F. HOKE 1,909,536

MATERIAL TRANSFER MECHANISM

Filed March 30, 1931

Inventor
Frank Hoke,
By Hood + Hahn.
Attorneys

Patented May 16, 1933

1,909,536

UNITED STATES PATENT OFFICE

FRANK HOKE, OF INDIANAPOLIS, INDIANA, ASSIGNOR TO HOLCOMB & HOKE MANUFACTURING COMPANY, OF INDIANAPOLIS, INDIANA, A CORPORATION OF INDIANA

MATERIAL TRANSFER MECHANISM

Application filed March 30, 1931. Serial No. 526,197.

The present application relates to material transfer mechanism, and more particularly to mechanism intended for conveying fluent material, delivered to the mechanism through a hopper, to a desired point. The primary object of the invention is to provide mechanism of this character so designed and constructed as to prevent "bridging" of the material in the hopper.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Figure 2:
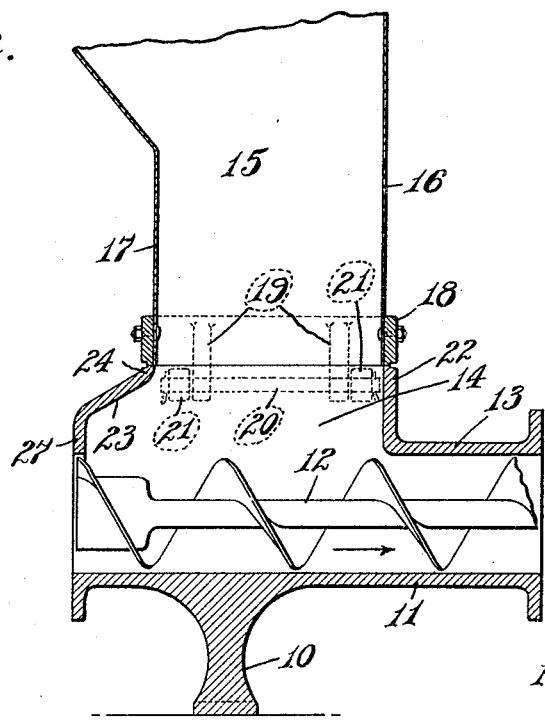

Fig. 1 is an end elevation of mechanism constructed in accordance with the present invention; and Fig. 2 is a substantially central transverse section through such mechanism.

Coal, coke, sand, ores, and other similar material are very often moved from place to place by screw conveyors, the material being shovelled or dumped into hoppers whence it is delivered to the screw conveyor which carries it, through a suitable conduit, to a point of use or disposition. In the handling of such materials in this manner, difficulties have always been encountered, due to the tendency of the material to "bridge" adjacent the mouth of the hopper. The tendency is for the material to lodge against the walls of the hopper or against the walls of the mouth of the conveyor tube, and for further material, moving downwardly through the center of the mass to become lodged against the material contacting the walls; so that eventually a bridge is built across the hopper mouth effectually preventing further movement of material downwardly into the conveyor tube. Numerous devices have been suggested for overcoming this difficulty, most of which have resembled either the device illustrated in the patent to Brunner, No. 1,518,898, wherein the forward wall of the hopper mouth is relieved forwardly; or the device of the patent to Daniels, No. 1,787,671, in which a deflector is provided, said deflector being secured to the forward wall of the hopper mouth and extending downwardly and rearwardly. While, in some instances, these arrangements have improved the operation of the mechanism, they have not cured the defect inherent in devices of this character. The present invention completely cures that defect, many hours of test runs by the applicant under the most adverse conditions, having failed to result in a single occurrence of bridging.

Referring more particularly to the drawing, it will be seen that I have illustrated conveyor mechanism comprising a base 10 carrying a substantially horizontally disposed conduit 11 in which is positioned a conveyor screw 12. In the upper wall 13 of the conveyor conduit 11 there is formed an inlet opening 14 with which registers the mouth 15 of a feed hopper. As is clearly shown, the forward and rearward walls 16 and 17 of the hopper mouth are, in accordance with standard practice, substantially vertical.

In the illustrated embodiment, the rim of the hopper mouth is embraced by a collar 18 provided at its opposite sides with pairs of ears 19 pivotally mounted upon rods 20 received in ears 21 formed on the conveyor body.

The forward edge of the opening 14 is bounded by an upstanding, substantially vertical wall 22 registering with the forward wall 16 of the hopper mouth 15, and extending from the hopper mouth to the general level of the upper wall 13 of the conveyor conduit. The rearward edge of the opening 14 is bounded by a wall 23 the upper end 24 of which registers with the rearward wall 17 of the hopper mouth, and which slopes sharply rearwardly therefrom to the rear end 27 of the conveyor body. As is clearly shown, the rear end 27 of the conveyor body is spaced a substantial distance behind the rearward wall 17 of the hopper mouth 15.

As will be obvious, the peculiar shape of the rearward bounding wall 23 for the opening 14 provides a rearward relief for the mass of material moving downwardly through the hopper mouth 15 into the conveyor conduit. Tests have shown that, so long as this relief is provided, the major downward movement of the mass through the hopper mouth 15 and into the conveyor conduit is along the forward wall 16 of the hopper mouth and the forward wall 22 of the conveyor inlet; and that bridging does not take place. For test purposes, a filler block was inserted in the conveyor body to form a vertical continuation of the upper portion 24 of the wall 23, and it was found that bridging almost immediately ensued after the insertion of said block.

While I am not prepared to explain the results obtained by the disclosed construction it is my belief that the results are due to the rearward relief effected by the shape of the wall 23.

I claim as my invention:

1. The combination with a screw conveyor, of a material storage chamber associated therewith, and a conduit connecting said chamber with said conveyor, the front wall of said chamber and the front wall of said conduit registering and being substantially vertically disposed, and the rear wall of said conduit being relieved rearwardly adjacent the point of discharge from said conduit to said conveyor, whereby arching of material in said conduit is prevented.

2. In combination, a hopper having a substantially vertical forward wall, a conveyor conduit having an opening into which material is discharged from said hopper, a driven conveyor element in said conduit adapted to move material forwardly through said conduit, the forward wall of said opening being substantially a continuation of the forward wall of said hopper, and the rear wall of said opening merging with the rear wall of said hopper and being relieved rearwardly thereof.

3. Conveyor mechanism for use in conjunction with a hopper, comprising a conduit, and driven conveyor means adapted to move material forwardly through said conduit, said conduit being provided with an inlet opening in its upper wall, the forward side of said opening being bounded by a vertical wall, and the rearward side of said opening being bounded by a wall sloping downwardly and rearwardly from the mouth of said opening.

4. In combination, a hopper having substantially vertical forward and rear walls adjacent its mouth, a conduit, a screw conveyor mounted in said conduit for rotation therein, an opening in the top wall of said conduit above said screw, a substantially vertical wall bounding the forward edge of said opening and registering with the front wall of said hopper mouth, and a wall bounding the rear edge of said opening, the upper end of said last-named wall registering with the rear wall of said hopper mouth, and said last-named wall sloping sharply rearwardy from its upper end toward the rear end of said screw.

In witness whereof, I have hereunto set my hand at Indianapolis, Indiana, this 26th day of March, A. D. one thousand nine hundred and thirty-one.

FRANK HOKE.